(12) United States Patent
Hashirayama et al.

(10) Patent No.: US 6,663,171 B2
(45) Date of Patent: Dec. 16, 2003

(54) HEAT INSULATOR APPARATUS FOR VEHICLE FLOOR

(75) Inventors: Naoki Hashirayama, Saitama (JP); Hidetoshi Kurata, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/162,190

(22) Filed: Jun. 5, 2002

(65) Prior Publication Data
US 2002/0185893 A1 Dec. 12, 2002

(30) Foreign Application Priority Data
Jun. 6, 2001 (JP) ........................ P.2001-171506

(51) Int. Cl.⁷ .............. B60H 1/24; B60H 1/26; B62D 25/20
(52) U.S. Cl. ...................... 296/204; 296/208
(58) Field of Search ............... 296/204, 39.1, 296/39.2, 203.01, 208; 180/68.2

(56) References Cited

U.S. PATENT DOCUMENTS

| | | | |
|---|---|---|---|
| 1,733,759 A | * 10/1929 | Snell | |
| 1,746,181 A | * 2/1930 | Baldwin | |
| 5,002,333 A | * 3/1991 | Kenmochi et al. | 296/204 |
| 5,108,817 A | * 4/1992 | Kidd et al. | 428/192 |
| 5,129,700 A | * 7/1992 | Trevisan et al. | 296/204 |
| 5,196,253 A | * 3/1993 | Mueller et al. | 428/138 |
| 5,219,439 A | * 6/1993 | Moor et al. | 296/204 |
| 5,609,383 A | * 3/1997 | Cahill | 296/39.1 |
| 5,813,491 A | * 9/1998 | Sato et al. | 296/204 |
| 5,829,824 A | * 11/1998 | Yamamuro et al. | 296/204 |
| 6,015,183 A | * 1/2000 | Vlahovic | 296/204 |
| 6,341,814 B1 | * 1/2002 | Honninger et al. | 296/208 |
| 6,547,301 B1 | * 4/2003 | Keller | 296/208 |
| 2002/0098316 A1 | * 7/2002 | Butler | 428/72 |
| 2002/0146354 A1 | * 10/2002 | Huang et al. | 422/168 |

FOREIGN PATENT DOCUMENTS

| | | | |
|---|---|---|---|
| DE | 4316095 | * 11/1994 | 296/204 |
| JP | 58-211976 | * 12/1983 | 296/204 |
| JP | 9-175198 | 7/1997 | |

* cited by examiner

Primary Examiner—Joseph D. Pape
Assistant Examiner—H. Gutman
(74) Attorney, Agent, or Firm—Sughrue Mion, PLLC

(57) ABSTRACT

A heat insulator apparatus for a vehicle floor, includes a plurality of heat insulating plates interposed between a vehicle floor and an exhaust part disposed below the vehicle floor in such a manner that the mutually adjoining heat insulating plates forms a gap therebetween to thereby form an air passage therebetween, for preventing the heat of the exhaust part from being transmitted to the vehicle floor. At least one of the heat insulating plates is formed such that an air entrance portion of the air passage is narrowed.

4 Claims, 6 Drawing Sheets

HEAT INSULATOR APPARATUS FOR VEHICLE FLOOR

BACKGROUND OF THE INVENTION

1. Field of the Invention

The present invention relates to a heat insulator apparatus for use in a vehicle floor which prevents the heat of an exhaust part from being transmitted to the vehicle floor.

2. Description of the Related Art

As a technique for preventing the heat of an exhaust part against transmission to the vehicle floor, for example, there is known a heat insulator for a vehicle which is disclosed in JP-A-9-175198. In the present heat insulator for a vehicle shown in FIG. 6, an outer heat insulating plate 1 is mounted below a floor 4 to form a gap G1, and an inner heat insulating plate 2 is mounted below the outer heat insulating plate 1 to form a gap G2. That is, provision of the gaps G1, G2 can enhance the heat insulating effect to thereby be able to increase the effect of insulation of the heat from an exhaust pipe 3 to the floor 4.

Also, during the running time of the vehicle, the air flows into the gaps G1, G2 to thereby carry out a cooling action, which can further enhance the heat insulating effect. In this manner, use of the heat insulator for a vehicle can shorten the distance between the floor and engine exhaust pipe system, which makes it possible to expand the freedom of the layout of the vehicle.

However, in the case of the above-mentioned conventional heat insulator for a vehicle, at the time when the vehicle stops after it has run once, the hot air within the gap G2 is easy to move upwardly from the front and rear edges of the outer heat insulating plate 1, so that the temperature of the floor is easy to rise.

Also, although the exhaust pipe 3 is cooled by the vehicle running wind that is drawn into the vehicle while the vehicle is running, the air, which has absorbed the heat of the exhaust pipe 3 and thus become hot, reaches directly to the floor from the rear ends of the outer and inner heat insulating plates 1 and 2 to thereby heat the floor, so that the temperature of the floor is easy to rise.

SUMMARY OF THE INVENTION

The present invention aims at eliminating the drawbacks found in the above-mentioned conventional heat insulator. Accordingly, it is an object of the invention to provide a heat insulator apparatus for a vehicle floor which, when a vehicle stops after it has run as well as while the vehicle is running, can enhance the heat insulating effect.

In attaining the above object, according to a first aspect of the invention, there is provided a heat insulator apparatus for a vehicle floor, wherein there are formed gaps each between the mutually adjoining ones of a plurality of heat insulating plates to thereby form air passages therebetween and these heat insulating plates are, as a group, interposed between a vehicle floor and an exhaust part disposed below the vehicle floor to thereby prevent the heat of the exhaust pipe from being transmitted to the vehicle floor, wherein the air entrance portion of at least one of the air passages is narrowed.

Since at least one of the air passages is narrowed in the air entrance portion thereof, in the vehicle stopping time after running, the air within the air passage lingers within the air passage to thereby secure the heat insulating characteristic of the air passage. Therefore, even in the vehicle stopping time after running, the heat insulator apparatus for a vehicle floor can provide a heat insulating effect.

Also, according to a second aspect of the invention, in a heat insulator apparatus for a vehicle floor as set forth in the first aspect, the heat insulating plates not only enclose the exhaust part but also are extended by a predetermined distance backwardly from the exit portion of the exhaust part.

In the vehicle running time, a running wind, the temperature of which has been raised due to heat radiated from the exhaust part, flows backwardly of the exhaust part and rises upwardly. Extension of the heat insulating plates by a predetermined distance backwardly of the exit portion of the exhaust part can prevent the transmission of the heat of the high-temperature running wind flowing backwardly of the exhaust part. Therefore, in the vehicle running time, the heat insulating effect can be enhanced.

DETAILED DESCRIPTION OF THE PREFERRED EMBODIMENTS

Figure 1:
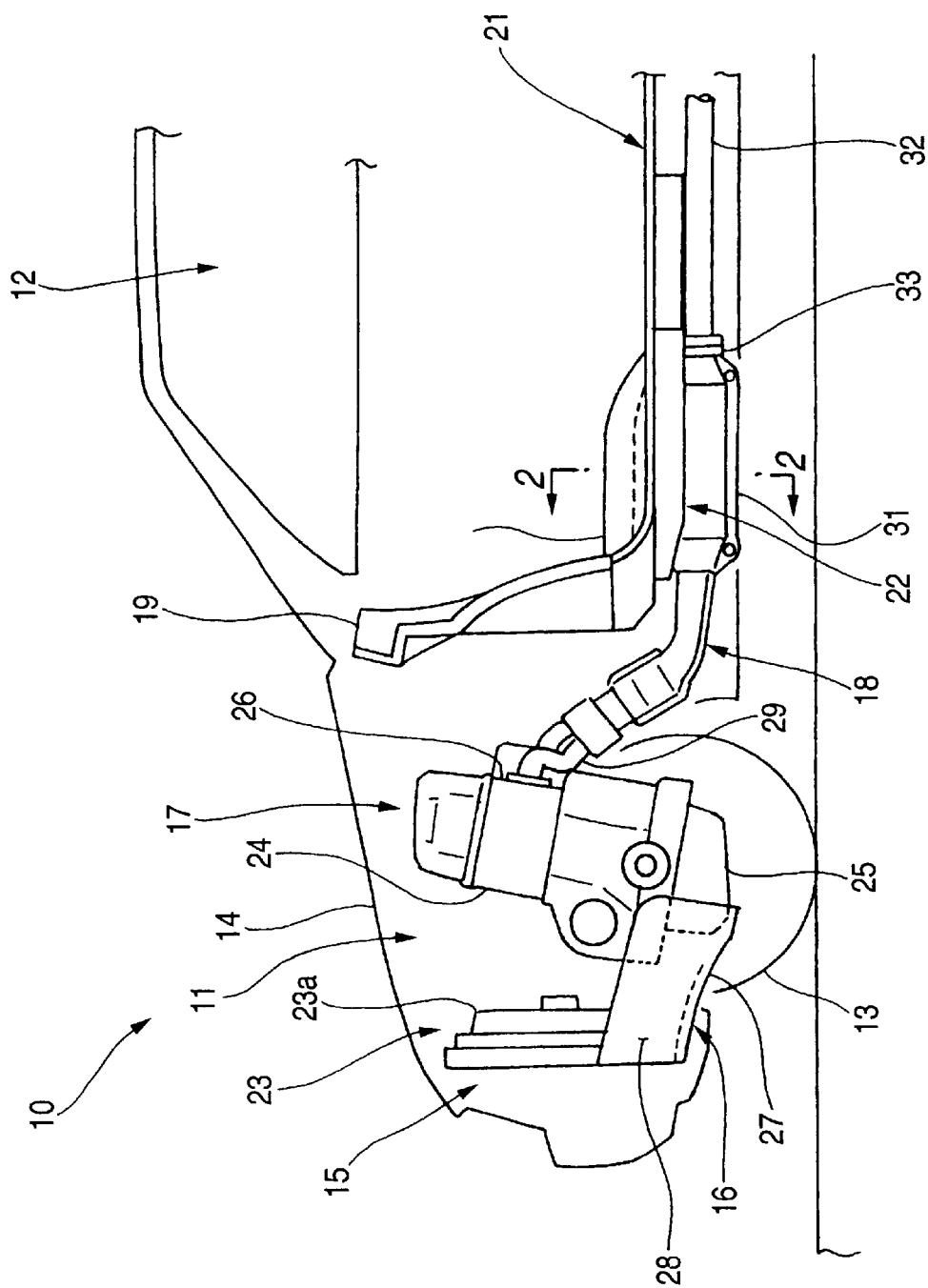
FIG. 1 is a side view of a vehicle incorporating therein a heat insulator apparatus according to the invention.

Now, description will be given below of a preferred embodiment of a heat insulator apparatus for a vehicle floor according to the invention with reference to the accompanying drawings. By the way, the drawings are to be viewed in the direction of reference characters.

FIG. 1 is a side view of a vehicle which incorporates therein a heat insulator apparatus according to the invention. In FIG. 1, a vehicle 10, which is of a front engine type, comprises an engine room 11, a passenger room 12 disposed next to the engine room 11, a front wheel 13 disposed in the front lower portion of the vehicle 10, a front fender 14 for covering the front wheel 13, a radiator 15 stored in the engine room 11, an air guard 16 disposed below the radiator 15, an engine 17 disposed in the central portion of the engine room 11, an exhaust apparatus 18 connected to the engine 17, a dashboard 19 disposed in the front portion of the passenger room 12, a floor 21 disposed in the lower portion of the passenger room 12, and a heat insulator apparatus 22 mounted on the lower portion of the floor 21.

The radiator 15 includes an electric fan 23 (a first fan 23a and a second fan 23b (see FIG. 5)). When a coolant reaches a predetermined temperature, or, desired conditions are met, the electric fan 23 is operated to thereby lower the temperature of the coolant.

The engine 17 includes a cylinder block 24, an oil pan 25 disposed in the lower portion of the engine 17, and an exhaust manifold 26 disposed in the rear portion of the engine 17.

The air guard 16 forms not only a horizontal plate 27 for covering the lower side of the radiator 15 but also vertical plates 28, 28 (only one of them is shown in FIG. 1) which are disposed so as to continue with the horizontal plate 27 and extend in the vertical direction on the right and left sides of the horizontal plate 27; and, the air guard 16 is used to guide the wind, which is produced by the electric fan 23, in the backward direction.

The exhaust apparatus 18 comprises a front exhaust pipe 29 connected to the exhaust manifold 26, a catalyst converter 31 which is an exhaust part connected to the front exhaust pipe 29, and a rear exhaust pipe 32 connected to the catalyst converter 31. Reference character 33 designates an exit portion of the catalyst converter 31.

Figure 2:
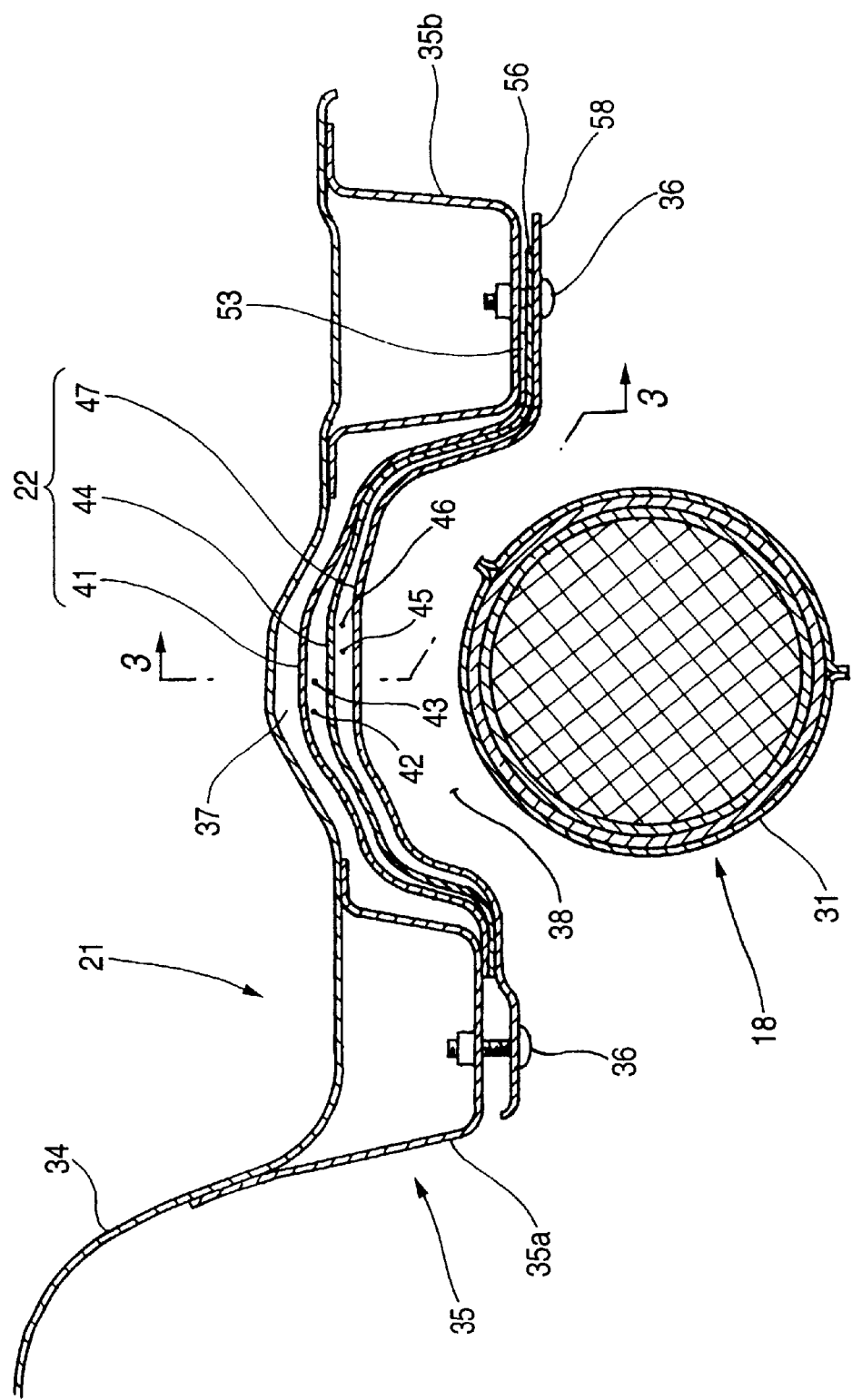
FIG. 2 is a section view taken along the line 2—2 shown in FIG. 1.

Now, FIG. 2 is a section view taken along the line 2—2 shown in FIG. 1, showing a state in which the heat insulator apparatus 22 is mounted on the lower portion of the floor 21 and the exhaust apparatus 18 is arranged below the heat insulator apparatus 22.

A projecting portion 34 is formed on the floor 21 and, next to the projecting portion 34, there is disposed a floor frame 35 (a first floor frame 35a, a second floor frame 35b). Reference numeral 36 . . . ( . . . expresses the plural, which expression applies similarly hereinafter) designates mounting bolts; 37: a space formed between the floor 21 and heat insulator apparatus 22; and 38: a space formed between the exhaust apparatus 18 and heat insulator apparatus 22, respectively. By the way, the heat insulator apparatus 22 is mounted using the mounting bolts 36 . . . ; however, the mounting means for mounting the heat insulator apparatus 22 is not limited to the mounting bolts 36 but, for example, the heat insulator apparatus 22 may also be mounted using rivets.

The heat insulator apparatus 22 includes an outer heat insulating plate 41, an intermediate heat insulating plate 44, and an inner heat insulating plate 47. The outer heat insulating plate 41 faces the lower surface of the floor 21. The intermediate heat insulating plate 44 is separated from the outer heat insulating plate 41 to thereby form a gap 42 between them and thus provide an air passage 43 between them. The inner heat insulating plate 47 is separated from the intermediate heat insulating plate 44 to thereby form a gap 45 between them and thus provide an air passage 46 between them and also which faces an exhaust part, that is, the catalyst converter 31.

Figure 3:
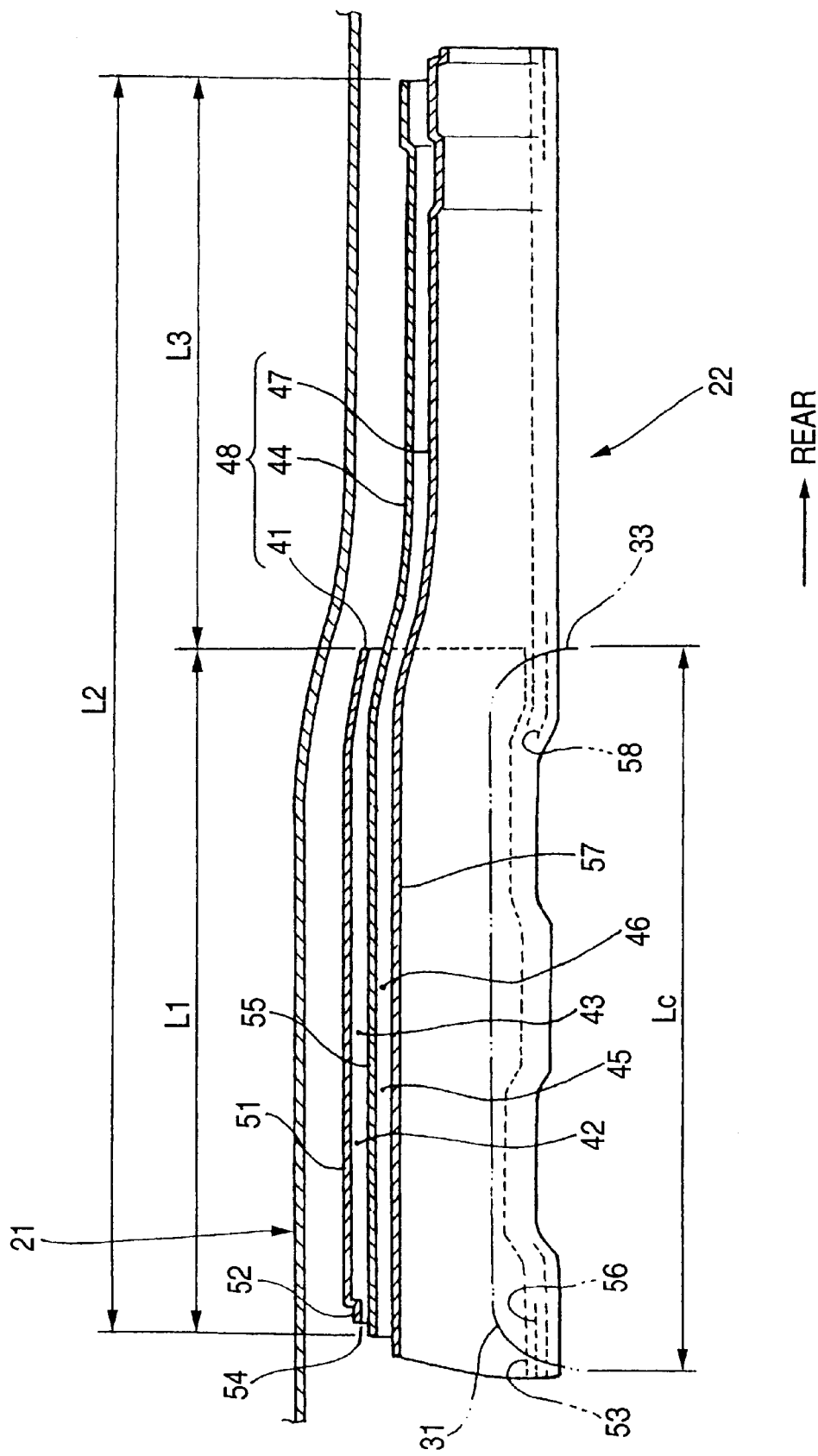
FIG. 3 is a section view taken along the line 3—3 shown in FIG. 1.

FIG. 3 is a section view taken along the line 3—3 shown in FIG. 2, showing a state in which the gaps 42 and 45 are formed between the plurality of heat insulating plates 41, 44, 47 to thereby provide the air passages 43, 46 and these heat insulating plates, as a group 48, are interposed between the floor 21 and the catalyst converter 31 disposed below the floor 21. Reference character Lc designates the length of the catalyst converter 31.

The outer heat insulating plate 41 includes a tunnel-shaped main body portion 51, a narrowed portion 52 formed in a step-shape in cross section at the front end portion of the main body portion 51, and two flange portions 53 formed in the two end portions of the outer heat insulating plate 41; and, the whole length of the outer heat insulating plate 41 is set for L1.

In this manner, by forming the narrowed portion 52 in the front end portion of the main body portion 51, the air entrance portion 54 of at least one air passage 43 of the air passages 43, 46 can be narrowed. Also, by setting the whole length of the outer heat insulating plate 41 for L1, the catalyst converter 31 can be enveloped.

The intermediate heat insulating plate 44 includes a tunnel-shaped main body portion 55 and two flange portions 56 formed in the two end portions of the main body portion 55; and, the whole length of the intermediate heat insulating plate 44 is set for L2, that is, the plate 44 is extended by a predetermined distance L3 backwardly (in the arrow mark direction) from the exit portion 33 of the catalyst 31.

The inner heat insulating plate 47 includes a tunnel-shaped main body portion 57 and two flange portions 58 formed in the two end portions of the main body portion 57; and, the whole length of the inner heat insulating plate 47 is set almost equal to the intermediate heat insulating plate 44, that is, the plate 44 is extended by a predetermined distance L3 backwardly (in the arrow mark direction) from the exit portion 33 of the catalyst 31.

By the way, when mounting the heat insulator apparatus 22, firstly, the flanges 53, 56, 58 are contacted closely with one another (see FIG. 2) and they are then spot welded together into an integral body; and, after then, the integral body is mounted onto the floor 21.

Next, description will be given below of the operation of the above-described heat insulator apparatus for a vehicle floor.

Figure 4:
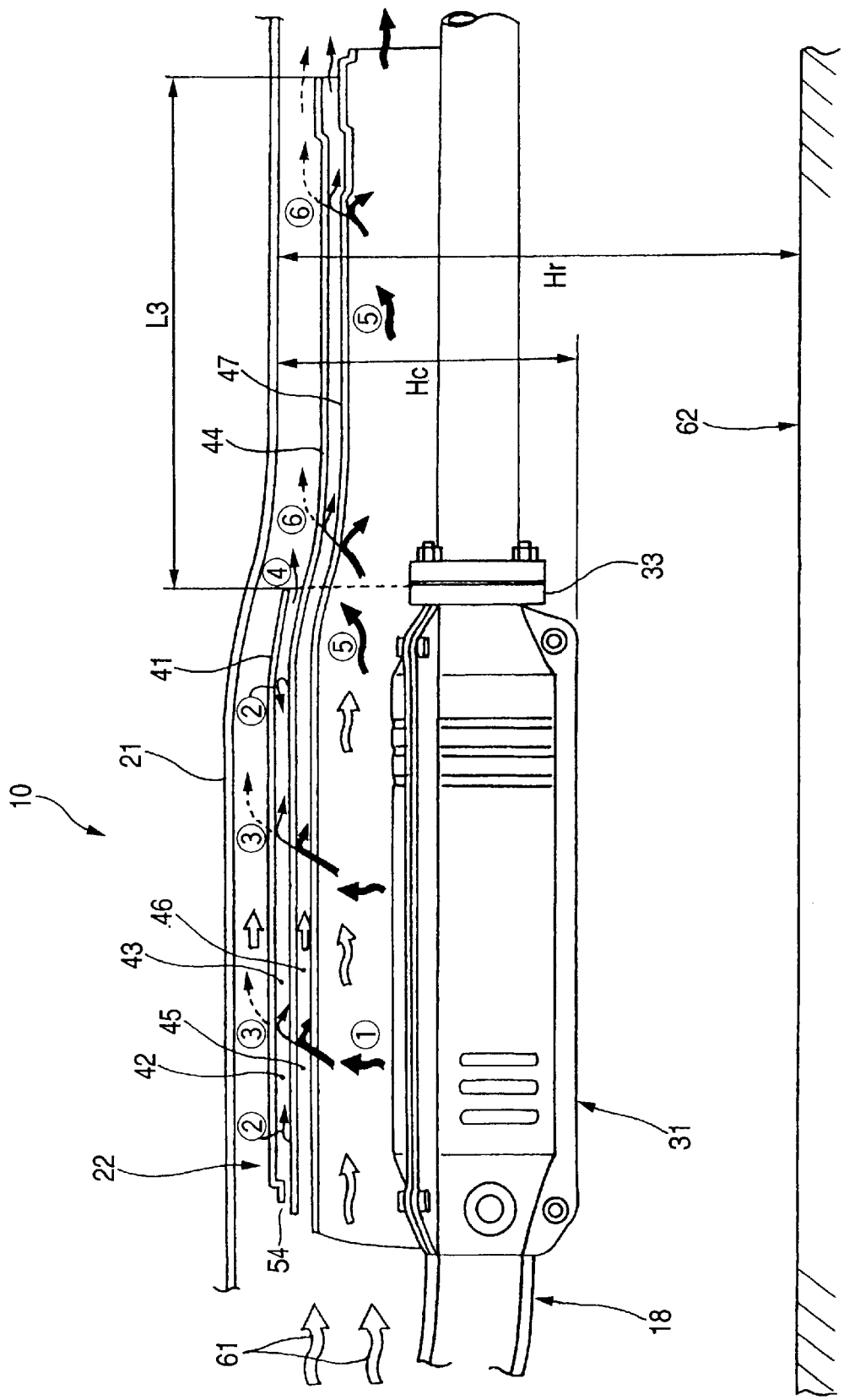
FIG. 4 is a first operation view of a heat insulator apparatus according to the invention.

FIG. 4 is a first operation view of a heat insulator apparatus for a vehicle floor according to the invention.

The catalyst converter 31 of the exhaust apparatus 18 is raised in temperature due to the high-temperature exhaust gas that is discharged from the engine, and the heat of the catalyst converter 31 is discharged as shown by the arrow mark ①; however, due to installation of the heat insulator apparatus 22, the heat from the catalyst converter 31 can be insulated.

Specifically, running winds 61, 61, which are produced while the vehicle is running and are shown by white arrow marks in FIG. 4, naturally cool the catalyst converter 31 and heat insulator apparatus 22 but, while the vehicle is stopping, the running winds 61, 61 are not produced and, therefore, the heat of the catalyst converter 31 rises just upwardly as shown by the arrow mark ①. In view of this, gaps 42, 45 are respectively formed between the mutually adjoining ones of the outer heat insulating plate 41, intermediate heat insulating plate 44 and inner heat insulating plate 47, to thereby form air passages 43, 46 respectively between them, and further, the air entrance portion 54 of at least one air passage 43 of the air passages 43, 46 is narrowed. Thanks to this, the air within the air passage 43 is difficult to flow and also the air is difficult to escape therefrom as shown by the arrow marks ②, ②, thereby enhancing the heat insulating effect in such a manner as shown by the arrow marks ③, ③, so that, during the vehicle stopping time, the heat from the catalyst converter 31 can be insulated effectively. Therefore, during the vehicle stopping time after running, the heat insulating effect can be enhanced.

Also, since the air entrance portion 54 of at least one air passage 43 of the air passages 43, 46 of the heat insulating apparatus 22 is narrowed, the air within the air passage 43 is difficult to flow and also the air is difficult to escape therefrom. As a result of this, during the vehicle stopping time after running, the air within the air passage 43 is difficult to leak as shown by the arrow marks ②, ②, thereby being able to restrain an increase in the temperature under the floor 21. Therefore, during the vehicle stopping time after running, the heat insulating effect can be enhanced.

Further, because the air entrance portion 54 is a narrowed opening, it not only allows the running winds 61, 61 to pass therethrough easily but also can discharge the heated air within the air passage 43 from the rear side thereof in such a manner as shown by the arrow mark ④. Therefore, during the vehicle stopping time after running, the heat insulating effect can be enhanced further.

On the other hand, during the vehicle running time, the heat from the catalyst converter 31 flows backwardly as shown by the arrow marks ⑤, ⑤. In view of this, since the intermediate heat insulating plate 44 and inner heat insulating plate 47 are both structured such that they envelope the catalyst converter 31 and are extended by the predetermined distance L3 backwardly from the exit portion 33 of the catalyst converter 31, the intermediate heat insulating plate 44 and inner heat insulating plate 47 can prevent the heat of the high-temperature running winds flowing backwardly from the catalyst converter 31 during the vehicle running time in such a manner as shown by the arrow marks ⑤, ⑤ from being transmitted to the lower portion of the floor 21, in such a manner as shown by the arrow marks ⑥, ⑥, thereby being able to restrain an increase in the temperature under the bottom surface of the floor 21. Therefore, during the vehicle running time, the heat insulating effect can be enhanced still further.

In this manner, since the heat insulator apparatus 22 is excellent in heat insulation, by making the catalyst converter 31 approach the bottom surface of the floor 21, the distance Hc from the floor 21 to the lower portion of the catalyst converter 31 can be reduced. As a result of this, the distance Hr between the lower surface of the floor 21 of the vehicle 10 and the road surface 62 can be reduced to thereby be able to lower the position of the bottom surface of the floor 21.

Figure 5:
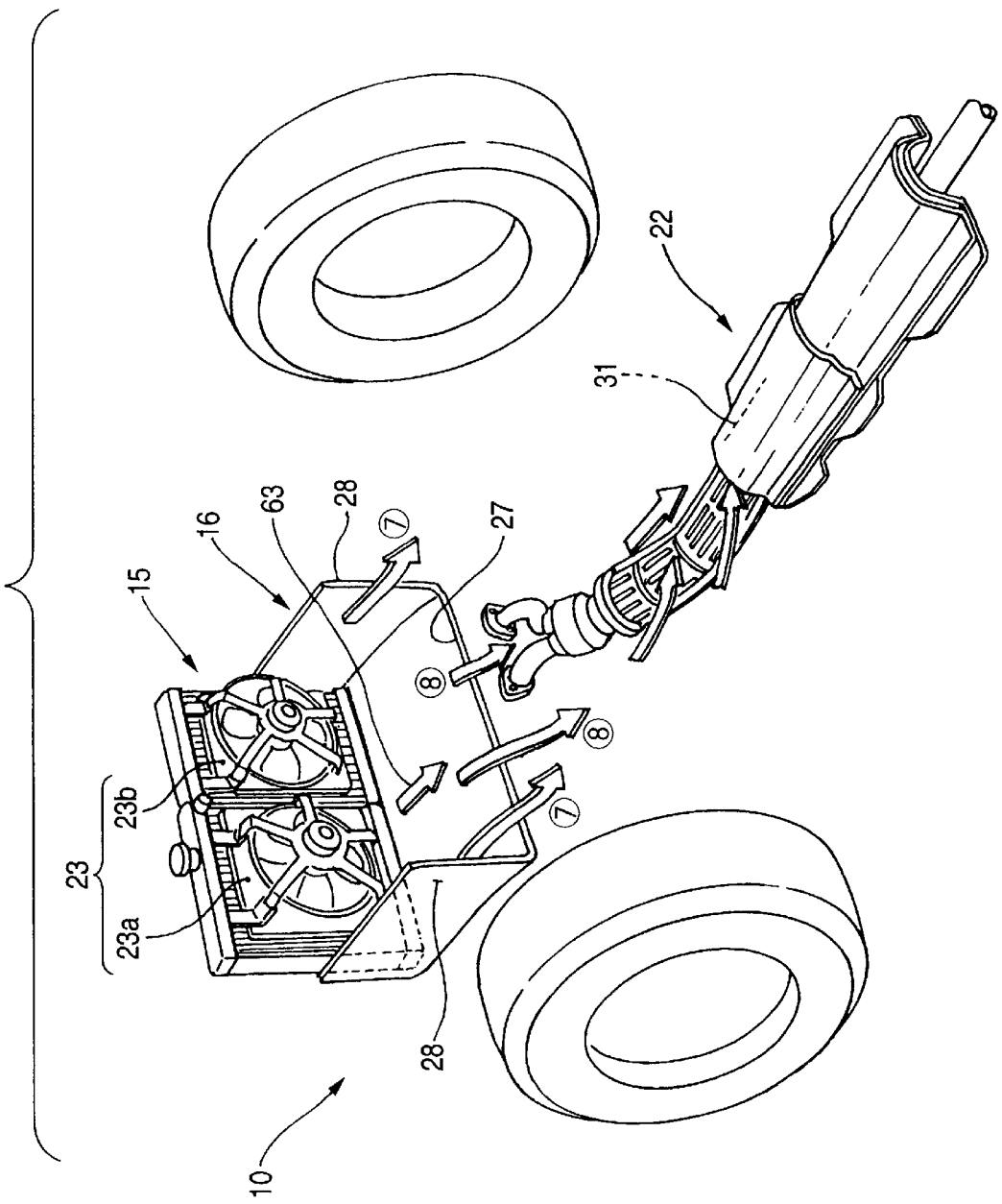
FIG. 5 is a second operation view of a heat insulator apparatus according to the invention; and, FIG. 6 is a longitudinal sectional view of a heat insulator for a vehicle of the conventional art.
Figure 6:
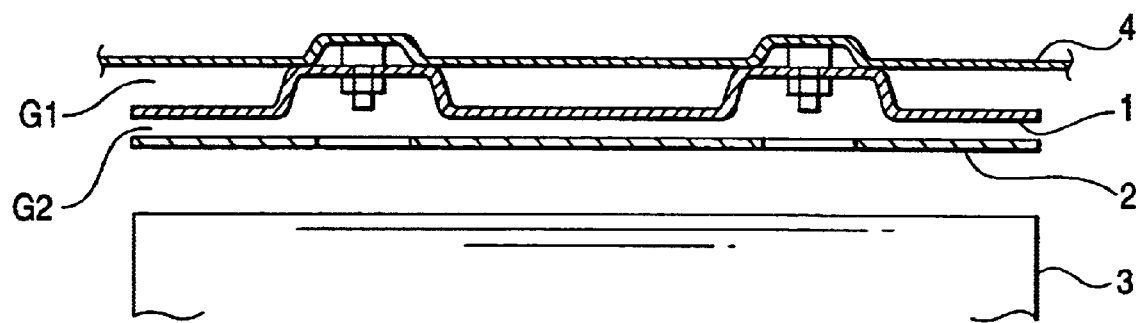

Now, FIG. 5 is a second operation view of a heat insulator apparatus for a vehicle floor according to the invention.

In the vehicle 10, a radiator 15 including an electric fan 23 (a first fan 23a and a second fan 23b) is disposed in front of the engine and, there is disposed an air guard 16 below the radiator 15. According to this structure, a wind 63 produced in the electric fan 23, due to provision of the vertical plates 28, 28 of the air guard 16, is not spread in the horizontal direction but flows along the arrow marks ⑦, ⑦ and, after then, flows into below the bottom surface of the vehicle floor. On the other hand, the wind 63, due to provision of a flat plate 27, is not spread just downwardly but, as shown by the arrow marks ⑧, ⑧, flows along an oil pan 25 (see FIG. 1) disposed in the lower portion of the engine and, after then, flows into below the vehicle floor. As a result of this, even in the stopping time of the vehicle 10 after running, while the engine is working, the wind 63 produced by the electric fan 23 of the radiator 15 can be guided efficiently to the heat insulator apparatus 22 and to the catalyst converter 31. Therefore, in the stopping time of the vehicle after running, a heat insulating effect can be enhanced.

By the way, the narrowed portion can also be formed in the rear end portion of the outer heat insulating plate 41 of FIG. 3 illustrated in the embodiment of the invention; and also, the narrowed portion can also be formed in each of the front and rear end portions of the outer heat insulating plate 41.

Further, the narrowed portion can also be formed in the front end portion of the intermediate heat insulating plate 44 shown in FIG. 3 to thereby narrow the air entrance portion of the air passage 46. Also, the narrowed portion can also be formed in the rear end portion of the intermediate heat insulating plate 44 or in each of the front and rear end portions thereof.

In the illustrated embodiment, as an example of the exhaust part, there is shown the catalyst converter 31. However, as the exhaust part, there can also be used other parts such as a silencer which forms the exhaust apparatus.

The structure of the floor frame 35 of the floor 21 shown in FIG. 2 can be selected arbitrarily.

The invention can provide the following effects owing to the above-mentioned structure.

That is, according to the first aspect of the invention, since the heat insulator apparatus for a vehicle floor is structured such that there are formed gaps each between the mutually adjoining ones of a plurality of heat insulating plates to thereby provide air passages between them and also at least one of the air passages is narrowed in the air entrance portion thereof, during the stopping time of the vehicle, the air within the air passages is difficult to flow and also it is difficult to escape therefrom, thereby being able to enhance the heat insulating effect, so that the heat from the exhaust part in the stopping time of the vehicle can be insulated effectively. Therefore, in the stopping time of the vehicle after running, the heat insulating effect can be enhanced.

Also, according to the second aspect of the invention, because the heat insulating plates are structured such that they enclose the exhaust part and also are extended by a predetermined distance backwardly from the exit portion of the exhaust part, the heat insulating plates can prevent the heat of the high-temperature running wind flowing backwardly of the exhaust part from being transmitted to below the bottom surface of the vehicle floor. Therefore, in the running time of the vehicle, the heat insulating effect can be enhanced.

What is claimed is:

1. A heat insulator apparatus for a vehicle floor, comprising: a plurality of heat insulating plates interposed between the vehicle floor and an exhaust part disposed below the vehicle floor in such a manner that the heat insulating plates form a gap therebetween to thereby form an air passage therebetween, for preventing the heat of the exhaust part from being transmitted to the vehicle floor, wherein at least one of the heat insulating plates is formed such that an air entrance portion of the air passage is narrowed.

2. The heat insulator apparatus as set forth in claim 1, wherein at least one of the heat insulating plates encloses an upper portion of the exhaust part, and is extended by a predetermined distance backwardly from an exit portion of the exhaust part.

3. The heat insulator apparatus as set forth in claim 2, wherein at least one of the heat insulating plates extended backwardly is disposed in a side close to the exhaust part.

4. The heat insulator apparatus as set forth in claim 1, wherein at least one of the heat insulating plates has a narrow portion formed in a step-shape in cross section at a front end portion thereof.

* * * * *